US011598670B2

(12) United States Patent
Yonetani et al.

(10) Patent No.: US 11,598,670 B2
(45) Date of Patent: Mar. 7, 2023

(54) IDENTIFICATION APPARATUS

(71) Applicant: CANON KABUSHIKI KAISHA, Tokyo (JP)

(72) Inventors: Yuki Yonetani, Kanagawa (JP); Shigeru Ichihara, Tokyo (JP); Yasuhiro Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/528,872

(22) Filed: Nov. 17, 2021

(65) Prior Publication Data

US 2022/0163390 A1 May 26, 2022

(30) Foreign Application Priority Data

Nov. 20, 2020 (JP) .............................. JP2020-193344

(51) Int. Cl.
*G01J 3/44* (2006.01)
*G01N 21/65* (2006.01)

(52) U.S. Cl.
CPC ................ *G01J 3/44* (2013.01); *G01N 21/65* (2013.01)

(58) Field of Classification Search
CPC .... G01J 3/44; G01J 3/0221; G01J 3/14; G01J 3/18; G01J 3/28; G01N 21/65; G01N 2021/845; G01N 2021/8592; G01N 21/85; B07C 5/342; B07C 5/366
See application file for complete search history.

(56) References Cited

U.S. PATENT DOCUMENTS

| 5,559,597 | A | 9/1996 | Battey |
| 9,304,038 | B2* | 4/2016 | Saxer ................... A61B 5/0066 |
| 2005/0052649 | A1 | 3/2005 | Tsujita |
| 2008/0309936 | A1 | 12/2008 | Krapu |
| 2010/0188537 | A1 | 7/2010 | Hiramoto |
| 2012/0126142 | A1 | 5/2012 | Matsui |
| 2015/0221693 | A1 | 8/2015 | Saitou |
| 2020/0300704 | A1 | 9/2020 | Sekine |

FOREIGN PATENT DOCUMENTS

| JP | 2011 226821 A | 11/2011 |
| JP | 2019105628 A | 6/2019 |

* cited by examiner

*Primary Examiner* — Abdullahi Nur
(74) *Attorney, Agent, or Firm* — Canon U.S.A., Inc. IP Division

(57) ABSTRACT

An identification apparatus includes a plurality of collecting units configured to collect scattered light from a plurality of test items, a first spectroscopic unit configured to disperse light from part of the plurality of collecting units, a second spectroscopic unit configured to disperse light from a remaining part of the plurality of collecting units, an imaging unit configured to acquire a first spectrum projected from the first spectroscopic unit and a second spectrum projected from the second spectroscopic unit, the imaging unit including a plurality of light receiving elements arranged at least in a first direction, and an acquisition unit configured to acquire information about the test items based on an output signal from the imaging unit. One of a wavenumber of the first spectrum and a wavenumber of the second spectrum in the first direction increases while the other one decreases.

23 Claims, 6 Drawing Sheets

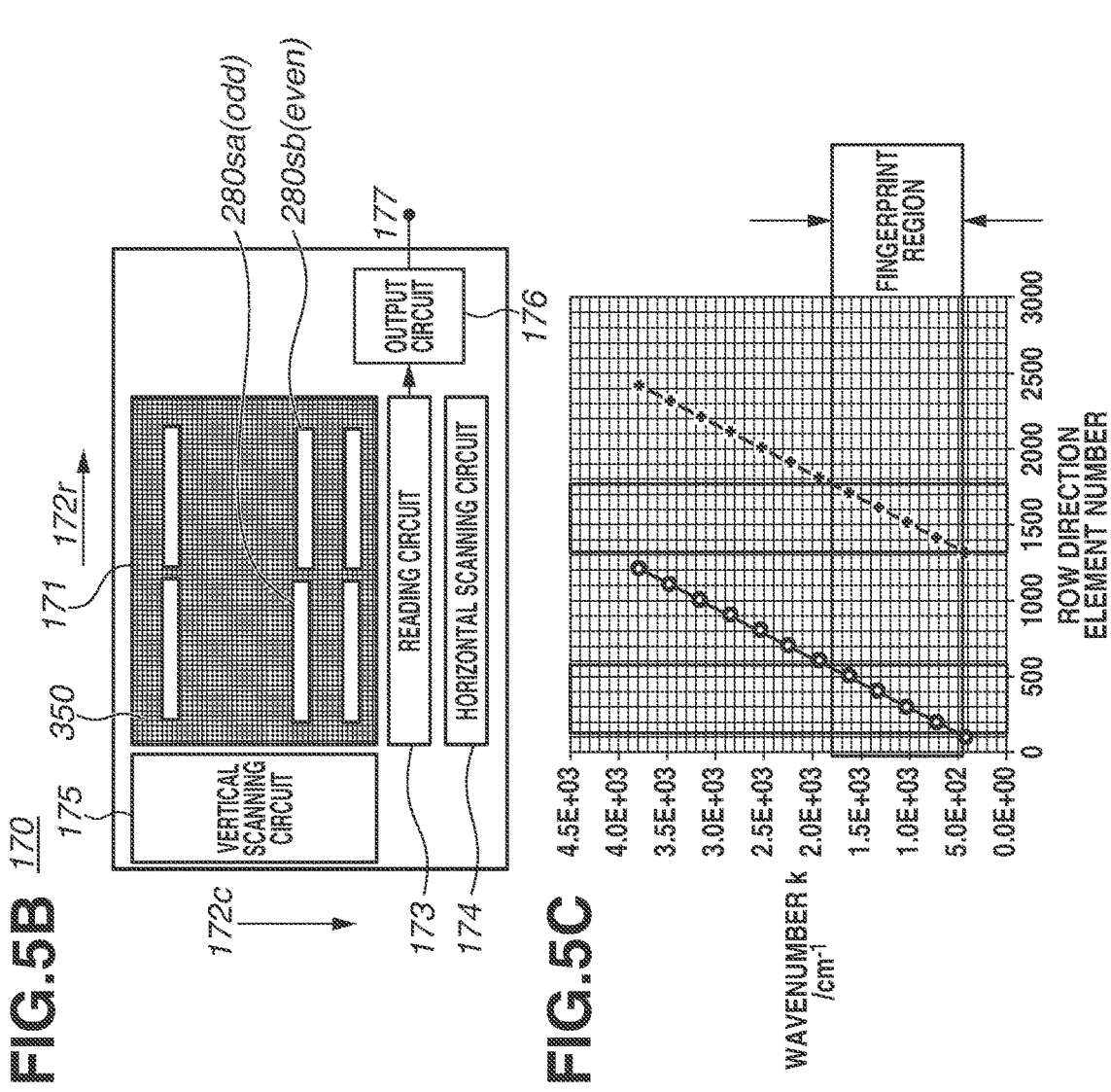
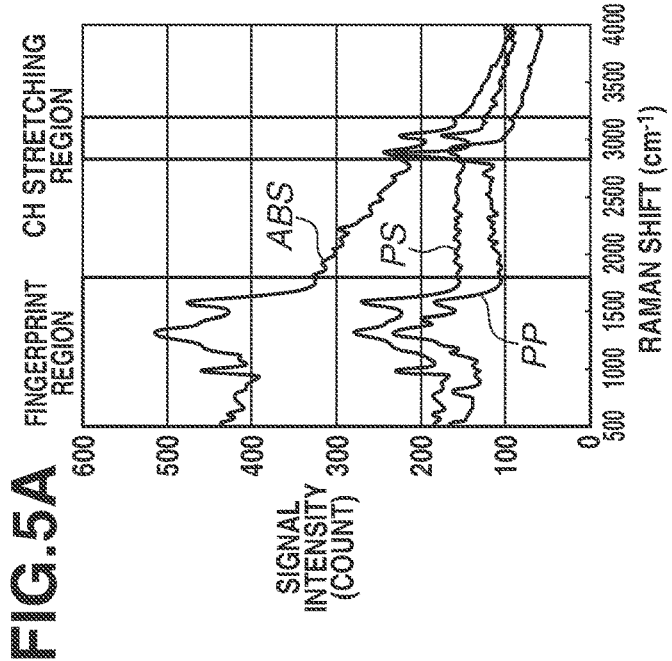

IDENTIFICATION APPARATUS

BACKGROUND OF THE DISCLOSURE

Field of the Disclosure

The aspect of the embodiments relates to an identification apparatus configured to identify properties such as a composition and components of a test item based on scattered light from the test item.

Description of the Related Art

There are known identification apparatuses that optically identify properties of a test item using spectroscopic analysis. The identification apparatuses are disposed at a position on a conveyance path through which a plurality of test items is conveyed to, for example, inspect products and sort waste materials.

The spectroscopic analysis does not always require an atmosphere management process relating to a vacuum/reduced-pressure process for limiting the throughput, an atmosphere control process, a process of immersion in a solution, and a drying process. Since the spectroscopic analysis enables identification of properties of a test item under an ambient atmosphere, application of the spectroscopic analysis to waste resin sorting has been attempted in recent years.

Infrared absorption spectroscopy and Raman scattering spectroscopy are known as the spectroscopic analysis. In infrared absorption spectroscopy, an absorption spectrum of incident light including an infrared wavelength range from a test item is acquired. In Raman scattering spectroscopy, a scattering spectrum of incident light including an ultraviolet wavelength range from a test item is acquired. Raman scattering spectroscopy is less likely to be affected by light attenuation due to the thickness of a sample and is thus used in identifying waste materials that vary in test item size. Raman scattering spectroscopy in which Raman scattered light is dispersed uses Raman shifts specific to interatomic bonds of a hydrocarbon. Thus, Raman scattering spectroscopy is suitable for resin identification.

The intensity of Raman scattered light is a few orders of magnitude lower than that of an elastic scattering component (Rayleigh scattered light) contained in secondary light, so that a method of irradiating a test item with condensed primary light to increase detection sensitivity per unit area is employed. There is known a sorting apparatus that sorts test items into target test items and non-target test items depending on whether a predetermined target condition is satisfied, based on a detected spectrum.

BUNSEKI KAGAKU Vol. 61, No. 12, pp. 1027-1032 (2012) discusses a waste resin sorting apparatus including an identification apparatus. The identification apparatus projects optical spectra from spectroscopic elements to two-dimensionally arranged charge-coupled device (CCD) image sensors to acquire optical spectra of a test item across the observed wavenumber range simultaneously without wavelength sweeping. The identification apparatus discussed in BUNSEKI KAGAKU Vol. 61, No. 12, pp. 1027-1032 (2012) projects the optical spectra from the spectroscopic elements along a lengthwise direction (row direction) of the CCD image sensors to acquire a spectral image at high speed by reading the optical spectra projected by the spectroscopic elements in a column direction.

Meanwhile, as a result of development in semiconductor manufacturing technology in recent years, 2K×4K image sensors such as complementary metal oxide semiconductor (CMOS) image sensors that are capable of performing high-definition, high-speed reading are available for use. With such image sensors capable of performing high-speed, high-definition image capturing and spectroscopic elements, small-size identification apparatuses having high-speed and large-amount identification capacity can be provided. Japanese Patent Application Laid-Open No. 2019-105628 discusses an identification apparatus including spectroscopic elements and CMOS image sensors. The spectroscopic elements disperse light from a plurality of light collecting units in parallel, and the CMOS image sensors capture a plurality of optical spectra from the spectroscopic elements in parallel. The identification apparatus discussed in Japanese Patent Application Laid-Open No. 2019-105628 is reduced in size by consolidating devices subsequent to the plurality of light collecting units into a single spectroscopic element and a single two-dimensional imaging unit. Furthermore, the identification apparatus discussed in Japanese Patent Application Laid-Open No. 2019-105628 drives the CMOS image sensors using a rolling-shutter, rolling-reset method to reduce effects between adjacent optical spectra projected in parallel in a column direction.

In order to increase the amount of identification processing per unit time, the identification apparatus discussed in Japanese Patent Application Laid-Open No. 2019-105628 is expected to employ a method in which a plurality of optical spectra is projected in a plurality of columns in both row and column directions of the image sensors. In this case, mutual effects between optical spectra projected to adjacent regions are expected to decrease if the angle of view of the image sensors and the number of mounted elements are increased and the number of spectra (projection density) per unit area of the image sensors is maintained. However, it has been found that the accuracy of identification processing might decrease although the number of projections is increased while the projection density of optical spectra is maintained. Consequently, it has been found that there might be a case where the amount of identification processing per unit time, while maintaining the identification accuracy, does not increase as expected.

SUMMARY OF THE DISCLOSURE

According to an aspect of the embodiments, an identification apparatus includes a plurality of collecting units configured to collect scattered light from a plurality of test items, a first spectroscopic unit configured to disperse light from part of the plurality of collecting units, a second spectroscopic unit configured to disperse light from a remaining part of the plurality of collecting units, an imaging unit configured to acquire a first spectrum projected from the first spectroscopic unit and a second spectrum projected from the second spectroscopic unit, the imaging unit including a plurality of light receiving elements arranged at least in a first direction, and an acquisition unit configured to acquire information about the test items based on an output signal from the imaging unit, wherein one of a wavenumber of the first spectrum and a wavenumber of the second spectrum in the first direction increases while the other one decreases.

According to another aspect of the embodiments, an identification apparatus includes a conveyance unit including a plurality of trucks and configured to convey a plurality of test items in parallel, a first collecting unit corresponding to a truck of the plurality of trucks and a second collecting unit corresponding to another truck of the plurality of trucks, a first spectroscopic unit configured to disperse light from the first collecting unit, a second spectroscopic unit configured to disperse light from the second collecting unit, an imaging unit configured to acquire a first spectrum projected from the first spectroscopic unit and a second spectrum projected from the second spectroscopic unit, the imaging unit including a plurality of light receiving elements arranged at least in a first direction, and an acquisition unit configured to acquire information about the test items based on an output signal from the imaging unit, wherein an increase direction of a wavenumber of the first spectrum with respect to addresses of the light receiving elements in the first direction and an increase direction of a wavenumber of the second spectrum with respect to the addresses of the light receiving elements in the first direction are opposite to each other.

Further features of the disclosure will become apparent from the following description of exemplary embodiments with reference to the attached drawings.

BRIEF DESCRIPTION OF THE DRAWINGS

FIGS. 5A, 5B, and 5C are diagrams illustrating Raman scattering spectra of an acrylonitrile butadiene styrene (ABS) resin, polystyrene, and polypropylene, projection regions of optical spectra, and a correspondence relationship between projection wavenumbers and row direction addresses of projected optical spectra.

DESCRIPTION OF THE EMBODIMENTS

Various exemplary embodiments of the disclosure will be described below with reference to the drawings.

Figure 1A:
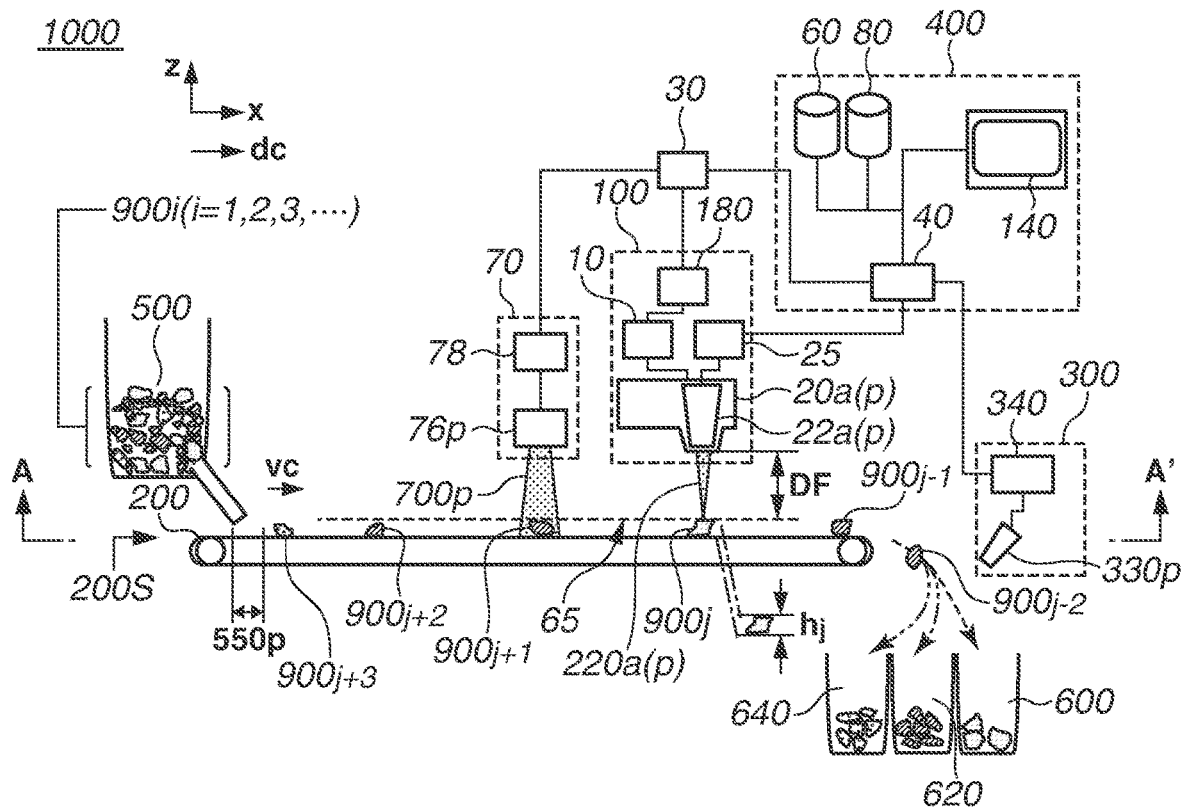
FIGS. 1A and 1B are views illustrating a schematic configuration of an identification apparatus according to a first exemplary embodiment.
Figure 1B:
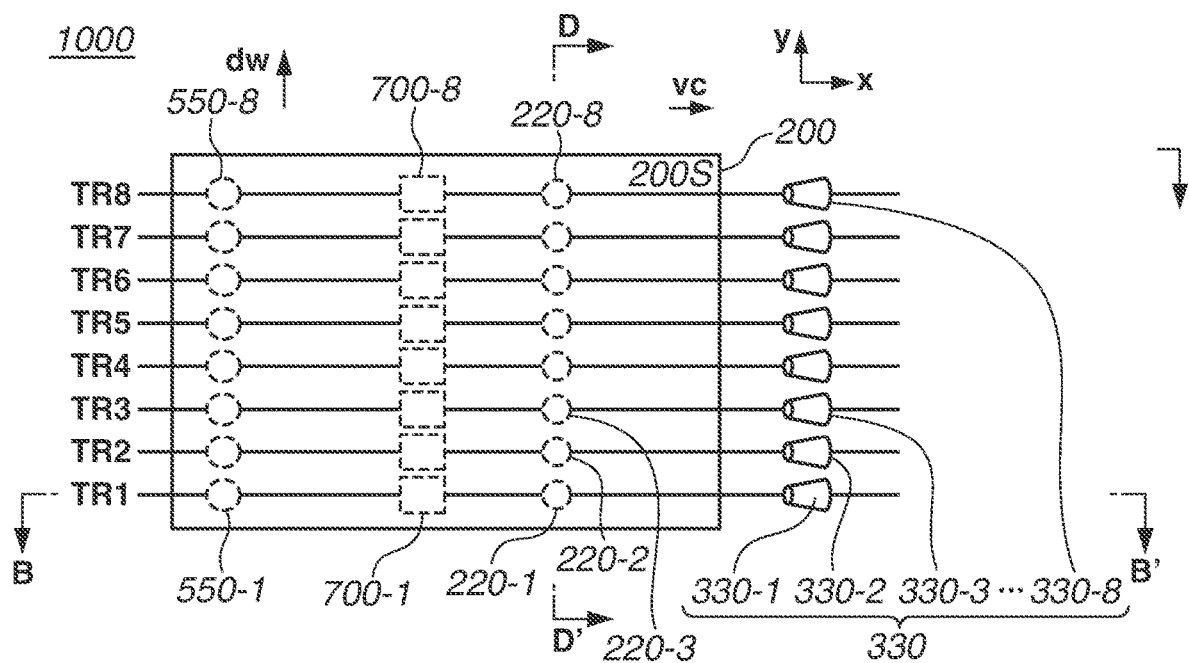
Figure 2A:
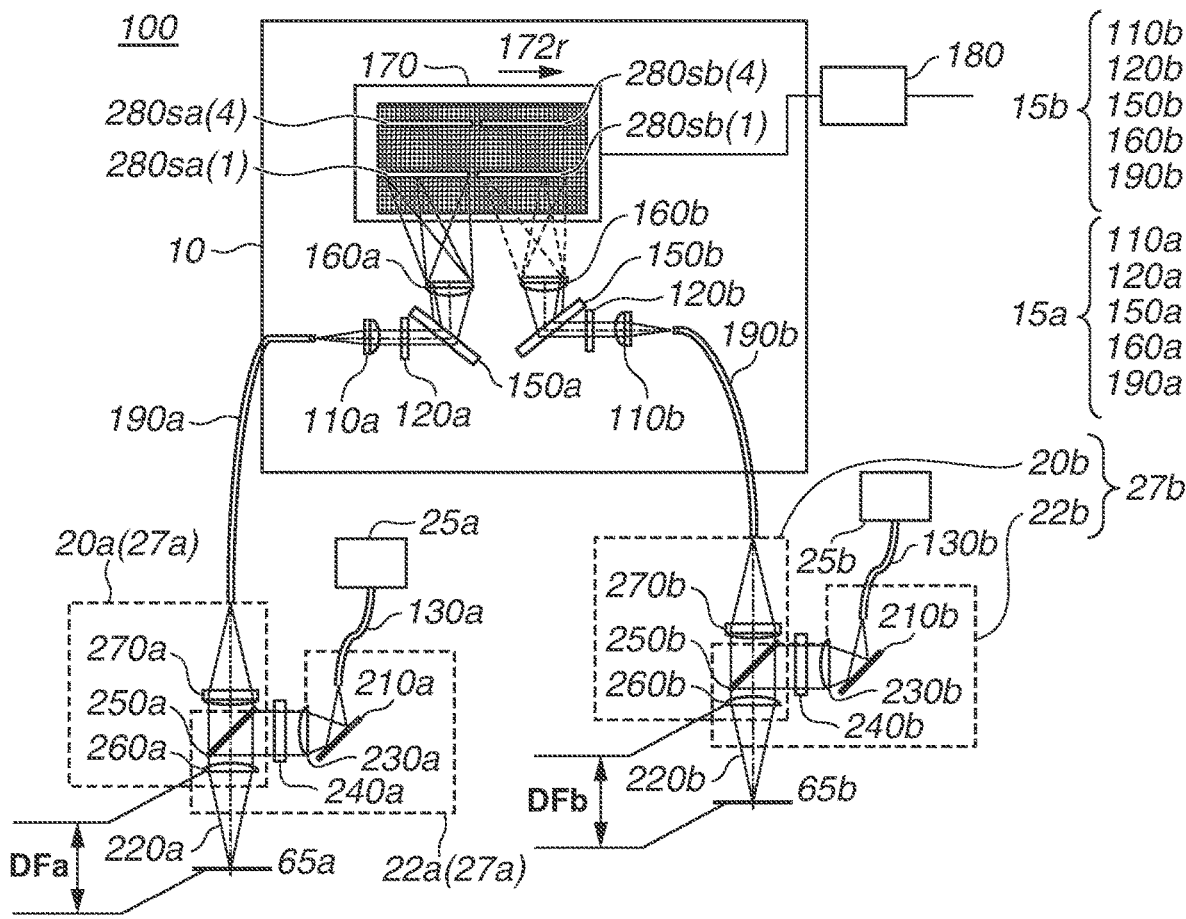
FIGS. 2A and 2B are diagrams illustrating projection regions of optical spectra on an imaging unit and a correspondence relationship between projection wavenumbers and row direction addresses according to the first exemplary embodiment.
Figure 2B:
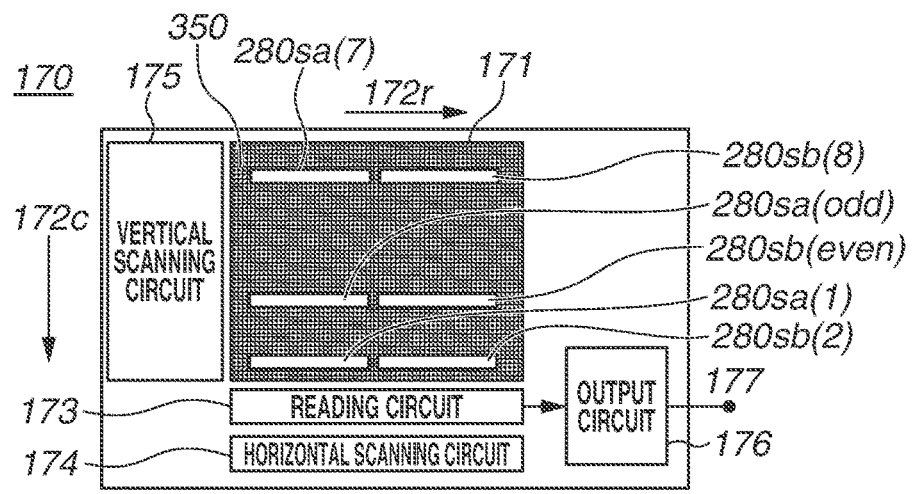
Figure 2C:
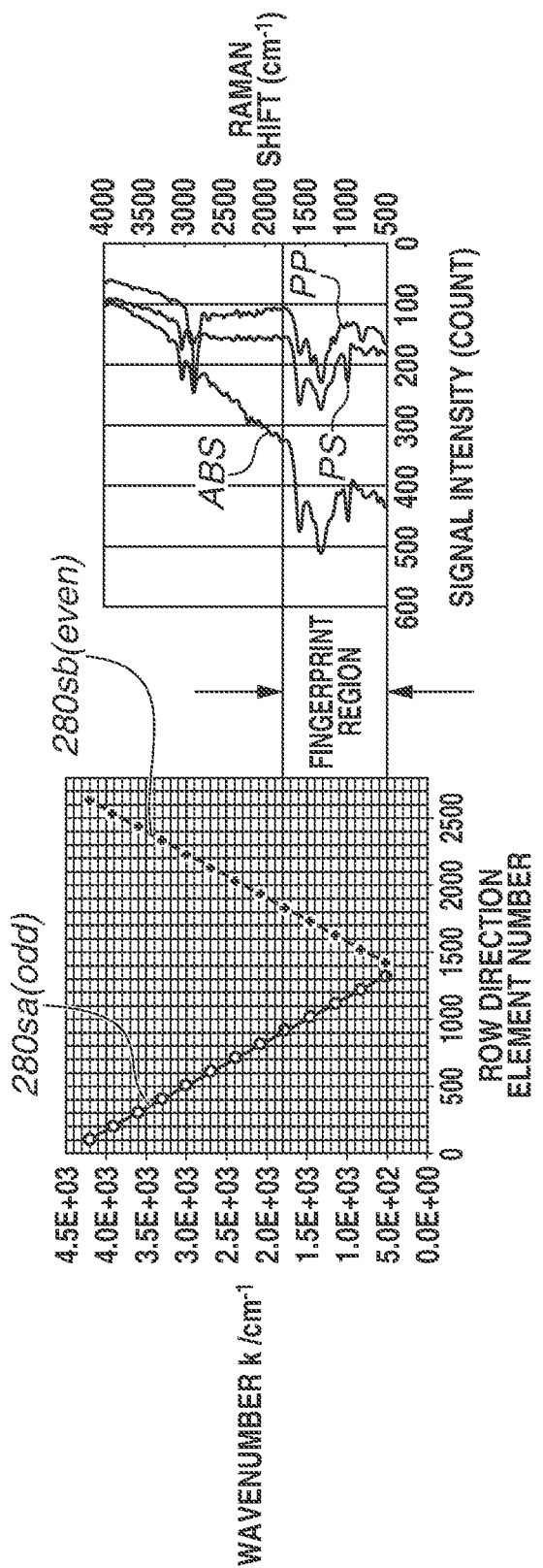
FIG. 2C is a diagram illustrating a projection wavenumber.

An identification apparatus according to a first exemplary embodiment will be described below with reference to FIGS. 1A, 1B, 2A, and 2B. FIGS. 1A and 1B are views schematically illustrating a configuration of an identification apparatus 1000 according to the present exemplary embodiment. FIG. 2A is a partial detailed view illustrating a spectral information acquisition unit 100 of the identification apparatus 1000 illustrated in FIG. 1A. FIG. 2B is a view illustrating a projection of optical spectra 280sa (odd) and 280sb (even) to an imaging unit 170. Further, FIG. 2C is a projection wavenumber—light receiving element address map illustrating a relationship between the numbers (row direction numbers) of light receiving elements arranged in a row direction 172r of the imaging unit 170 and the wavenumbers of optical spectra projected in the row direction 172r. The term "light receiving element number" is also referred to as a row direction address of a light receiving element or a row direction number of a light receiving element.

In FIG. 1A, a −z-direction corresponds to a vertical direction, i.e., gravity direction, and an x-direction corresponds to a conveyance direction dc. Further, a y-direction corresponds to a conveyance width direction dw, and an xy-plane corresponds to a horizontal plane.

The conveyance width direction dw matches a direction that is parallel to a conveyance surface 200S and perpendicular to the conveyance direction dc.

Identification Apparatus

As illustrated in FIG. 1A, the identification apparatus 1000 includes an irradiation unit 22. The irradiation unit 22 irradiates a test item 900i conveyed in the conveyance direction dc with irradiation light 220 to focus the irradiation light 220 on the test item 900i. The test item 900i is fed to a conveyance unit 200 by a feeder 500 and conveyed along the conveyance direction dc by the conveyance unit 200. The irradiation light 220 is also referred to as "converged light 220" or "primary light 220". The identification apparatus 1000 also includes a light collecting unit 20 and an acquisition unit 30. The light collecting unit 20 corresponds to the irradiation unit 22 and collects scattered light from the test item 900i. The acquisition unit 30 acquires identification information for identifying properties of the test item 900i, based on the light collected by the light collecting unit 20.

Further, as illustrated in FIG. 1A, the identification apparatus 1000 includes the conveyance unit 200 and discrimination apparatus 300. The conveyance unit 200 includes a conveyor belt that conveys the test item 900i in the x-direction at a conveyance velocity vc. The discrimination apparatus 300 is provided downstream of the conveyance unit 200 in the conveyance direction dc. FIG. 1B is a diagram illustrating the conveyance unit 200 and a plurality of conveyance trucks TR-p (p=1 to 4). FIG. 1B corresponds to a projection view illustrating the light collecting unit 20 and the discrimination apparatus 300 of the identification apparatus 1000 to a plane A-A' in FIG. 1A as a projection plane. A cross-section B-B' in FIG. 1B corresponds to the schematic configuration diagram illustrated in FIG. 1A.

Next, the spectral information acquisition unit 100 of the identification apparatus 1000 will be described in detailed below with reference to FIGS. 2A, 2B, and 2C. The spectral information acquisition unit 100 relates to a feature of the present exemplary embodiment and includes a spectroscopic element and an imaging unit.

Spectral Information Acquisition Unit

The identification apparatus 1000 includes the spectral information acquisition unit 100 which is configured to acquire spectral information about light collected from the test item 900i. The spectral information acquisition unit 100 is a unit that acquires a Raman shift from the difference in wavenumber between Raman scattered light contained in secondary light from the test item 900i and excitation light contained in primary light.

As illustrated in FIGS. 1A and 2A, the spectral information acquisition unit 100 includes the irradiation units 22a(p) and 22b(p) and the light collecting units 20a(p) and 20b(p). The irradiation units 22a(p) and 22b(p) irradiate the test item 900i with irradiation light 220a(p) and irradiation light 220b(p), respectively. The light collecting units 20a(p) and 20b(p) collect secondary light from the test item 900i. FIG. 1A is a schematic configuration diagram illustrating an xz-plane viewed from the y-direction and corresponding to a conveyance truck TRp having a truck number p that is an odd number in FIG. 1B. FIG. 1A illustrates the feeder 500, a camera 76p, the light collecting unit 20a(p), the irradiation unit 22a(p), and an air nozzle 330p arranged on the conveyance truck TRp of the odd-number column p. Although not illustrated in FIG. 1A, the feeder 500, the camera 76p, a light collecting unit 22b(p), the irradiation unit 20b(p), and the air nozzle 330p are also arranged on a conveyance truck p corresponding to an even-number column p.

The plane view in FIG. 1B is a schematic configuration diagram illustrating the plane A-A' in FIG. 1A viewed from the z-direction.

The light collecting unit 20a(p) and the irradiation unit 22a(p) are coaxially arranged, and the irradiation unit 22a(p) is optically coupled to a light source 25a including a laser light source via an optical fiber 130p. Similarly, the irradiation unit 22b(p) and the light collecting unit 20b(p) are coaxially arranged. Hereinafter, for simplification, the suffix (p) indicating the truck number p of the conveyance truck TRp may be omitted.

The light collecting units 20a and 20b are optically coupled to a spectral image acquisition unit 10 so that the spectral information acquisition unit 100 can acquire optical information regarding materials contained in the test item 900i. A collecting unit 27a includes the irradiation unit 22a and the light collecting unit 20a, and a collecting unit 27b includes the irradiation unit 22b and the light collecting unit 20b.

According to the present exemplary embodiment, suffixes a and b at the end of each numeral are associated with different collecting units 27a and 27b, respectively. Specifically, the suffixes (a, b, c, d . . . ) at the end of each numeral are used to be associated with a plurality of components provided to process light collected in parallel from different light collecting units therewith. The suffixes a and b are associated with the conveyance truck TRp having a truck number p that is an odd number and the conveyance truck TRp having a truck number p that is an even number.

Collecting Unit

FIG. 2A is a diagram schematically illustrating an example of a configuration of the spectral information acquisition unit 100. The spectral information acquisition unit 100 includes the collecting unit 27a including the irradiation unit 22a that irradiates one of the test items 900i with light and the light collecting unit 20a that Raman scattered light from the test item 900i. Similarly, the spectral information acquisition unit 100 includes the collecting unit 27b including the irradiation unit 22b that irradiates another of the test items 900i with light and the light collecting unit 20b that collects Raman scattered light from the other one of the test items 900i. The irradiation unit 22a and the light collecting unit 20a are coaxially arranged on the test item side (object side) when viewed from a dichroic mirror 250a, and even in a case where the test item 900i has a height difference or tilt, a positional deviation is less likely to occur between the center of an irradiation spot and the center of light flux of collected scattered light. Similarly, the irradiation unit 22b and the light collecting unit 20b are coaxially arranged on the test item side (object side) when viewed from a dichroic mirror 250b.

The collecting units 27a and 27b respectively guide light collected from different test items to spectroscopic elements 150a and 150b via optical fibers 190a and 190b to identify the different test items in parallel. The spectroscopic elements 150a and 150b will be described below.

According to the present exemplary embodiment, the collecting units 27a and 27b are respectively arranged on the conveyance trucks TRp and TRp+q. With this arrangement, a shared imaging unit 170 performs identification processing in parallel on two test items conveyed in parallel to the different conveyance trucks TRp and TRp+q. A form that the collecting units 27a and 27b are respectively provided upstream and downstream of the same conveyance truck TRp and collect light from two different test items is also encompassed within the scope of the disclosure as a modified example of the present exemplary embodiment.

Irradiation Unit

As illustrated in FIGS. 1A and 2A, the irradiation units 22a and 22b each have a focal distance DF to form a focal plane 65 at a position at a predetermined distance WD from the conveyance surface 200S and are both arranged above the conveyance unit 200. The irradiation units 22a and 22b are arranged to focus the irradiation light 220 toward an upper surface of an test item 900i, so that the scattering intensity of Raman scattered light, which is a few orders of magnitude lower than Rayleigh scattered light, is increased. A unit including the irradiation unit 22a and the light source 25a may be referred to as an "irradiation optical system". The light sources 25a and 25b can be replaced by a form that uses a common light source (not illustrated).

As illustrated in FIG. 2A, the irradiation units 22a and 22b respectively include objective lenses 260a and 260b, the dichroic mirrors 250a and 250b, collimating lenses 230a and 230b, cylindrical lenses 240a and 240b, and reflection mirrors 210a and 210b. The objective lenses 260a and 260b can include a convex lens, a collimating lens, a concave lens, and/or a zoom lens.

As a material for the glass lenses such as the collimating lenses 230a and 230b, the cylindrical lenses 240a and 240b, and the objective lenses 260a and 260b, synthetic quartz can be used. For the foregoing lenses that are irradiated with high-output light from the light sources 25a and 25b, use of lenses containing synthetic quartz as the lens material reduces background components of fluorescence and Raman scattered light.

The objective lenses 260a and 260b act as condensing lenses that condense light from the light sources 25a and 25b onto the test items 900i (i=0, 1, 2 . . . ) in the irradiation units 22a and 22b, respectively. The objective lenses 260a and 260b form the focal plane 65, a focal spot (not illustrated) with a focal diameter $\varphi$, and a focal depth $\Delta DF$ correspondingly to a numerical aperture NA at a position that is at the focal distance DF from the objective lens 260. The height of the focal plane 65 with respect to the conveyance surface 200S is set considering a distribution of height hi of the test item 900i (i=1, 2, 3 . . . ).

The collimating lenses 230a and 230b and the cylindrical lenses 240a and 240b reduce the scattering of light emitted from the light sources 25a and 25b to shape the light into parallel light. The cylindrical lenses 240a and 240b can be other collimating optical elements such as anamorphic prism pairs. Further, a wavelength filter such as a laser line filter can be provided at each position of pupil surfaces of the irradiation units 22a and 22b. This adjusts wavelength characteristics of light with which the irradiation units 22a and 22b irradiate the test item 900i.

As illustrated FIG. 2A, at least part of the irradiation units 22a and 22b can be shared with the light collecting units 20a and 20b. Since the light collecting units 20a and 20b and the irradiation units 22a and 22b according to the present exemplary embodiment are coaxially arranged, the objective lenses 260a and 260b and the dichroic mirrors 250a and 250b are shared by the light collecting unit 20 and the irradiation unit 22.

Light Source

The light sources 25a and 25b are light sources that emit excitation light to the irradiation units 22a and 22b through optical fibers 130a and 130b, respectively. The irradiation optical system for dispersing Raman scattered light uses laser light sources each having an excitation wavelength from 400 nm to 1100 nm as the light sources 25a and 25b. In Raman scattering, excitation efficiencies increase at shorter wavelengths, and background fluorescent components decrease at longer wavelengths.

In other embodiment, the excitation wavelengths of the laser light sources applied to the light sources 25a and 25b are selected so that a difference in Raman shift between a target material and a non-target material is clear.

A wavelength of at least one of 532 nm, 633 nm, 780 nm, and 1064 nm may be used as the excitation wavelengths of the laser light sources. While a case where the light sources 25a and 25b are used as light sources of the irradiation units 22a and 22b is described herein, the present exemplary embodiment is not limited to those described herein, and other laser light sources such as a semiconductor excitation solid-state laser or a gas laser can be used.

Light Collecting Unit

The light collecting units 20a and 20b are arranged above the conveyance surface 200S to collect secondary light from an upper surface of the test item 900i conveyed by the conveyance unit 200. In other words, the light collecting units 20a and 20b are arranged above the conveyance unit 200 to face an irradiation region irradiated with the irradiation light 220a and 220b from the irradiation units 22a and 22b in order to collect secondary light from an upper surface of the test item 900i passing through the irradiation region.

The light collecting units 20a and 20b include the objective lenses 260a and 260b, the dichroic mirrors 250a and 250b, imaging lenses 270a and 270b, and the optical fibers 190a and 190b, respectively. Like the irradiation unit 22, the objective lenses 260a and 260b of the light collecting units 20a and 20b include a convex lens, a collimating lens, a concave lens, and/or a zoom lens. The light collecting unit 20 may include a wavelength filter such as a band-pass filter or a long-pass filter for reducing excitation light components of primary light in order to reduce unnecessary light in spectrometric measurement.

The light collecting units 20a and 20b each employ an objective lens with a large numerical aperture to enhance the light collection efficiency or employ an objective lens with a small numerical aperture to keep a working distance and a focal depth. More specifically, a SCHOTT B-270 having an effective lens diameter of 25 mm, a focal distance of 20 mm, and a numerical aperture of 0.5 can be used as the objective lens.

Spectral Image Acquisition Unit

As illustrated in FIG. 2A, light from the two collecting units 27a and 27b is guided in parallel to the spectral image acquisition unit 10 according to the present exemplary embodiment through the optical fibers 190a and 190b. The spectral image acquisition unit 10 includes imaging lenses 110a and 110b, long-pass filters 120a and 120b, the spectroscopic elements 150a and 150b, imaging lenses 160a and 160b, and the imaging unit 170 in this order from the collecting units 27a and 27b side. The suffixes a and b added to the components according to the present exemplary embodiment correspond to the collecting units 27a and 27b. The suffixes a and b may correspond to two test items undergoing identification processing in parallel.

The spectroscopic elements 150a and 150b are arranged to disperse light collected by the collecting units 27a and 27b and project optical spectra to the imaging unit 170 along the row direction 172r of light receiving elements 350.

As illustrated in FIGS. 2A and 2B, the optical spectrum 280sa (odd) for the collecting unit 27a (odd) and the optical spectrum 280sb (even) for the collecting unit 27b (even) are projected to different positions in the row direction 172r of the light receiving elements 350. Each symbol or number in parentheses is the number assigned to each collecting unit of the imaging unit 170. According to the present exemplary embodiment, the collecting unit corresponds to the truck number p of the conveyance truck TRp in FIG. 1B.

The collecting units 27a (odd) are arranged correspondingly to the conveyance trucks TRp (p=1, 3, 5, 7) with the truck number p that is an odd number. Specifically, the collecting units 27a(1), 27a(3), 27a(5), and 27a(7) are arranged correspondingly to the conveyance trucks TRp (p=1, 3, 5, 7). Similarly, the collecting units 27b (even) are arranged correspondingly to the conveyance trucks TRp (p=2, 4, 6, 8) with the truck number p that is an even number. Specifically, the collecting units 27b(2), 27b(4), 27b(6), and 27b(8) are arranged correspondingly to the conveyance trucks TRp (p=2, 4, 6, 8).

According to the present exemplary embodiment, the optical spectra 280sa(1), 280sb(2) . . . 280sa(7), and 280sb(8) for the eight collecting units 27a(1), 27b(2) . . . 27a(7), and 27b(8) projected in the form of a matrix with four rows and two columns onto the imaging unit 170.

Further, the optical spectrum 280sa (odd) for the collecting unit 27a and the optical spectrum 280sb (even) for the collecting unit 27b are arranged in the row direction 172r with a boundary between element numbers 1341 and 1361 as illustrated in FIG. 2B. In this case, wavenumbers of the optical spectra 280sa (odd) and 280sb (even) with respect to element addresses of the light receiving elements 350 increase in opposite directions as illustrated in FIG. 2B. In other words, one of the wavenumbers of the optical spectra 280sa (odd) and 280sb (even) according to the present exemplary embodiment increases while the other decreases in the row direction 172r as illustrated in FIG. 2B.

Similarly, the optical spectra 280sa (odd) and 280sb (even) are projected to different positions on the imaging unit 170 in the row direction 172r of the imaging unit 170. The optical spectra 280sa(1), 280sa(3), 280sa(5), and 280sa (7) are projected to different positions from each other in a column direction 172c of the imaging unit 170. Similarly, the optical spectra 280sb(2), 280sb(4), 280sb(6), and 280sb (8) are projected to different positions from each other in the column direction 172c of the imaging unit 170. The row and column directions indicating the arrangement of the light receiving elements 350 are perpendicular to each other and are also referred to as a first direction and a second direction intersecting with the first direction.

Low-wavenumber ends of the optical spectra 280sa (odd) and 280sb (even) are close to each other at the adjacent element numbers 1341 and 1361 in the row direction 172r. Specifically, the projected optical spectra 280sa (odd) and 280sb (even) increase in opposite directions to each other with respect to the addresses of the light receiving elements 350 in the row direction 172r. The optical spectra 280sa (odd) and 280sb (even) increasing in opposite directions as illustrated in the projection wavenumber—element address correspondence relationship in FIG. 2C are realized by arranging the spectroscopic elements 150a and 150b in a mirror-relationship as illustrated in FIG. 2A. Specifically, the spectroscopic element 150a projects spectral components corresponding to larger diffraction angles to smaller row direction addresses of the light receiving elements 350.

On the other hand, the spectroscopic element 150*b* is arranged to project spectral components corresponding to larger diffraction angles to greater row direction addresses of the light receiving elements 350.

The identification apparatus 1000 according to the present exemplary embodiment includes the collecting units 27*a*(*p*) and 27*b*(*p*), i.e., the light collecting units 22*a*(*p*) and 22*b*(*p*), correspondingly to the odd and even numbers of the truck number p of the conveyance truck TRp. The identification apparatus 1000 according to the present exemplary embodiment includes a plurality of optical fibers 190*a* as a first light guiding unit. The plurality of optical fibers 190*a* guides a plurality of light beams from the plurality of light collecting units 22*a*(*p*) that is part of the plurality of light collecting units to the spectroscopic element 150*a*(*p*). Similarly, the identification apparatus 1000 according to the present exemplary embodiment includes a plurality of optical fibers 190*b*(*p*) as a second light guiding unit. The plurality of optical fibers 190*b*(*p*) guides a plurality of light beams from the plurality of light collecting units 22*b*(*p*) that is the remaining part of the plurality of light collecting units to the spectroscopic element 150*b*(*p*). The spectroscopic elements 150*a*(*p*) and 150*b*(*p*) arranged on different conveyance trucks TRp and having opposite projection wavenumber directions with respect to the element addresses of the imaging unit 170 may also be referred to as "first spectroscopic element" and "second spectroscopic element". Similarly, the spectroscopic elements 150*a*(*p*) and 150*b*(*p*) may also be referred to as "first spectroscopic unit" and "second spectroscopic unit". In other words, the first spectroscopic unit and the second spectroscopic unit respectively include the spectroscopic elements 150*a* and 150*b* having different taper angles from each other with respect to the imaging unit 170.

Next, a technical meaning of the reversely projecting in the wavenumber direction will be described below.

The dependence of Raman scattered light on wavenumbers will be described below. As illustrated in FIG. 5A, the wavenumber dependence of Raman scattered light intensity may be negatively sloped towards the right side in the wavenumber axis, exhibiting a trend close to a monotonic decrease. To increase the number of items to be identified that can be processed in parallel, a plurality of optical spectra may be arranged in parallel in a forward direction along the row direction of the imaging unit 170. The forward direction is also referred to as "same direction" or "common direction". In this case, a high wavenumber end and a low wavenumber end of two adjacent optical spectra were near each other as illustrated in FIG. 5B, and it is found that there is a great intensity difference in detection signals of Raman scattered light between the adjacent light receiving elements.

As illustrated in a wavenumber—element address map in FIG. 5C, the parallel projection of two optical spectra in the forward direction (same direction) may cause an effect between adjacent optical spectra. Such an effect between adjacent optical spectra is also referred to as crosstalk between the optical spectra. The crosstalk between adjacent optical spectra includes at least one of an electrical effect and an optical effect.

The imaging unit 170 includes low-impedance lines, but an electric constant distribution on the line is not zero, and there is more than a slight electric constant distribution on the line. Furthermore, high-speed reading is also required. Further, the imaging unit 170 is not a perfect light-absorber for Raman scattered light components or excitation light components and fluorescence components that are unsuccessfully removed by the filters and have thus entered. Thus, electric crosstalk may affect a neighborhood of an intended projection position through the transfer of some of charges converted photoelectrically by the light receiving elements 350 along a line on which a parasitic capacitor is provided. On the other hand, optical crosstalk may affect a neighborhood of an intended projection position as halo-pattern noise through the returning and reentering of backscattered light from a light receiving unit 171 in the form of a concentric circle. In any of the electrical and optical effects, low-intensity detection signals acquired by the light receiving elements with low-intensity Raman scattering signals are often affected by the crosstalk.

High wavenumber ends of the two optical spectra 280*sa* (odd) and 280*sb* (even) according to the present exemplary embodiment are close to each other in the row direction 172*r*. In other words, fingerprint regions of the optical spectra 280*sa* (odd) and 280*sb* (even) where an average signal intensity of Raman scattered light is relatively high are close to each other. The two optical spectra 280*sa* (odd) and 280*sb* (even) have a small difference in Raman signal intensity and are adjacent to each other under a condition where the optical spectra 280*sa* (odd) and 280*sb* (even) are less likely to affect each other.

Thus, with the identification apparatus 1000 according to the present exemplary embodiment, mutual effects of optical spectra of the imaging unit 170 in the wavenumber direction are reduced, as compared to a paralleling method in which two optical spectra are adjacent to each other in the row direction under a condition where the difference in intensity between detection signals of Raman scattered light is large.

Imaging Unit

For the imaging unit 170, an imaging device such as a charge-coupled device (CCD) image sensor or a complementary metal oxide semiconductor (CMOS) image sensor that includes light receiving elements arranged two-dimensionally is employed. While the plurality of light receiving elements 350 of the imaging unit 170 is arranged in a matrix form, in a case of a delta arrangement, the row and column directions are associated with two of the three axial directions or are associated with one of the three axial directions and a synthesized direction obtained by synthesizing the remaining two axial directions.

The identification apparatus 1000 identifies properties of the test item 900*i* while the conveyance unit 200 conveys the test item 900*i*, and the discrimination apparatus 300 described below discriminates the test item 900*i* based on the identification result. Thus, to increase the throughput of discrimination processing, the conveyance velocity vc of the conveyance unit 200 is increased. The optical spectra 280*sa* (odd) and 280*sb* (even) projected on the imaging unit 170 originate from Raman scattered light from the test item 900*i* moving on the conveyance surface 200S. Thus, while the test item 900*i* being conveyed is in the irradiation region irradiated with the irradiation light 220 from the irradiation unit 22, the optical spectra 280*sa* (odd) and 280*sb* (even) are formed on the imaging unit 170. For example, in a case where the conveyance velocity vc of the conveyance unit 200 is 2 m/sec and the length of the test item 900*i* in the conveyance direction dc is 10 mm, the time during which the imaging unit 170 can detect an optical spectrum formed by Raman scattered light from the test item 900*i* is 5 milliseconds or less. Therefore, in one embodiment, the frame rate of the imaging unit 170 is high. An imaging unit with a high frame rate is a CMOS image sensor, and a CMOS image sensor is suitably employed as the imaging unit 170.

Further, since the intensity of Raman scattered light from the test item 900i is significantly low as described above, the intensity of light incident on an element of the light receiving element 350 of the imaging unit 170 is also significantly low. Thus, in one embodiment, the imaging unit 170 having high sensitivity to the wavenumber regions is used where the optical spectra 280sa (odd) and 280sb (even) are acquired. In general, a rolling shutter image sensor has a simple pixel structure and a higher aperture ratio than a global shutter image sensor, and the size of a photoelectric conversion element can be increased. Thus, with a rolling shutter image sensor, the sensitivity and dynamic range are increased. Further, having a simple pixel structure, a rolling shutter image sensor has a benefit that the cost is lower than a global shutter image sensor. For the above-described reasons, a rolling shutter CMOS image sensor is used as the imaging unit 170 according to the present exemplary embodiment.

For the imaging unit 170, a rolling reset image sensor that sequentially resets the light receiving elements 350 row by row can be employed. This maximizes the exposure time of each row of the light receiving elements 350 and increases the sensitivity.

The imaging unit 170 according to the present exemplary embodiment has a crop reading function of reading a specific row in the light receiving unit 171 where the light receiving elements 350 are two-dimensionally arranged in the row direction 172r and the column direction 172c. Thus, in a case where a morphologic information acquisition unit 70 described below detects an arrival of the test item 900i at a light collectable region where the light collecting unit 20 can collect light, the imaging unit 170 reads a specific row in the light receiving unit 171 that corresponds to the light collecting unit 20.

The imaging unit 170 includes a reading circuit 173, a horizontal scanning circuit 174, a vertical scanning circuit 175, and an output circuit 176. The imaging unit 170 sequentially reads signals from a plurality of pixels arranged in a matrix form row by row. The vertical scanning circuit 175 selects a row in the light receiving unit 171 and drives the selected row. The reading circuit 173 reads signals output from pixels of the row selected by the vertical scanning circuit 175 and transfers the read signals to the output circuit 176 based on control by the horizontal scanning circuit 174. This is how reading in a main scan direction (row direction) is performed. Further, the row selected by the vertical scanning circuit 175 is shifted, and the reading circuit 173 performs reading in the main scan direction based on control by the horizontal scanning circuit 174. This is repeated, and the selected row is shifted in a sub-scan direction (column direction), whereby signals are read from the entire light receiving unit 171. The read signals are output as output signals to a material information reference unit 180 provided outside the imaging unit 170 through an output end 177 of the output circuit 176. In this case, scanning in the main scan direction is performed at high speed, and the speed of scanning in the sub-scan direction is lower than the speed of scanning in the main scan direction.

The imaging lenses 110a and 110b change light collected by the light collecting units 20a and 20b and guided through the optical fibers 190a and 190b, respectively, into parallel light. The long-pass filters 120a and 120b reduce excitation light components contained in the collected light and transmit Raman scattered light components. The spectroscopic elements 150a and 150b disperse spectral components obtained by dispersing the collected light in a fan shape. In this case, the spectroscopic elements 150a and 150b are arranged with respect to the imaging unit 170 to mutually reverse the increase directions thereof on a projection wavenumber-element address map. In other words, the spectroscopic elements 150a and 150b are arranged with respect to the imaging unit 170 to mutually reverse wavenumber directions of projection spectra of the spectroscopic elements 150a and 150b that are projected to the imaging unit 170. In other words, the spectroscopic elements 150a and 150b mutually reverse change directions of wavenumbers of projection spectra of the spectroscopic elements 150a and 150b that are projected to the imaging unit 170.

The imaging lenses 160a and 160b project light dispersed by the spectroscopic elements 150a and 150b onto the imaging unit 170. The spectroscopic elements 150a and 150b are transmission gratings. Alternatively, a reflection grating can be used. In this case, a Rowland arrangement or a Czerny-Turner method is employed as a spectroscopic element configuration. The spectroscopic elements 150a and 150b may be also referred to as "gratings 150a and 150b".

The imaging unit 170 acquires spectral information Si about the test item 900i in consideration of captured optical spectra, photoelectric conversion characteristics of the light receiving elements 350 of the imaging unit 170, and optical system transmission characteristics. In addition, the spectroscopic elements 150a and 150b can acquire polarization information including circular dichroism and optical rotatory dispersion together with the optical spectra.

According to the present exemplary embodiment, the spectroscopic element 150a is considered as an optical element contained in the first spectroscopic unit. Further, the spectroscopic element 150b is considered as another optical element contained in the first spectroscopic unit.

According to the first exemplary embodiment, the imaging unit 170 is provided with the plurality of spectroscopic elements 150a and 150b to reverse the change directions of the wavenumbers of the projection spectra. According to a modified example of the first exemplary embodiment, the change directions of the wavenumbers of the projection spectra are reversed with one spectroscopic element for one imaging unit. The modified example of the first exemplary embodiment is realized by a configuration as described below. A difference between the modified example and the first exemplary embodiment will be described below. Two collecting units including light collection channels A and B are provided so that collimated light beams obtained by collimating two collected light beams from the two collecting units into small-diameter beams using a fiber collimator are caused to enter a single spectroscopic element (grating) with a predetermined distance d therebetween. From an output side (opposite side to an incidence side) of a single spectroscopic element, two diffraction light beams are emitted from positions separated by a distance d from each other correspondingly to the two small-diameter beams. One of the two diffraction light beams forms an image on the imaging unit 170 through a single cylindrical lens A1. The other diffraction light beam is relayed by two cylindrical lenses B1 and B2 and then forms an image on the imaging unit 170 through the third cylindrical lens B3. As described above, the present modified example is realized by devising the focal point of the projection-side optical system.

For example, one of the diffraction light beams forms an image on the imaging unit 170 through the cylindrical lens A1 having in-plane power, whereas the other one of the diffraction light beams forms an image on the imaging unit 170 through the cylindrical lenses B1, B2, and B3. In a case where the focal distance of the cylindrical lens A1 is 100 mm, the focal distances of the cylindrical lenses B1 and B2 can be set to 25 mm and 50 mm, respectively, so that two projection spectra are formed on the imaging unit 170 in a state where the change directions of the wavenumbers of the two projection spectra are reversed.

According to the present modified example, an incidence region of a channel A on a single spectroscopic element (grating) and the cylindrical lens A1 can be considered as an optical element of the first spectroscopic unit. Further, an incidence region of a channel B on a single spectroscopic element (grating) and the cylindrical lenses B1 to B3 can be considered as an optical element of the second spectroscopic unit. In other words, according to the present modified example, the first spectroscopic unit and the second spectroscopic unit share a spectroscopic element (grating) having different irradiation regions. In other words, the first spectroscopic unit and the second spectroscopic unit share a spectroscopic element so that light beams from a plurality of collecting units irradiate different positions.

Material Information Reference Unit

The spectral information acquisition unit 100 includes the material information reference unit 180 configured to acquire material information about the test item 900*i* based on the spectral information Si acquired by the spectral image acquisition unit 10. The material information reference unit 180 refers to a material database (not illustrated) storing Raman scattered light reference data and acquires material information Mi identifying a material contained in the test item 900*i* based on the similarity between the spectral information Si and the reference data. The spectral information acquisition unit 100 stores at least one of the spectral information Si and the material information Mi in a first storage unit 60 via an instruction unit 40 described below.

Further, the material database that the material information reference unit 180 refers to can be stored on a local server of the identification apparatus 1000 or on a remote server accessible via the Internet or an intranet.

As described above, the spectral information acquisition unit 100 acquires the material information Mi about mixtures of materials, additives, and impurity components contained in the test item 900*i*.

Morphologic Information Acquisition Unit

As illustrated in FIGS. 1A and 1B, the morphologic information acquisition unit 70 includes the camera 76*p* disposed so that an imaging field of view 700*p* overlaps the conveyance truck TRp (p=1 to 8) of the conveyance unit 200. The morphologic information acquisition unit 70 further includes an image processing unit 78 configured to process a test item image captured by the camera 76*p*. The morphologic information acquisition unit 70 acquires morphologic information Fi about the test item 900*i*. The morphologic information Fi, like the material information Mi, is information about properties of the test item 900*i*.

The image processing unit 78 performs image processing including contrast and contour extraction and acquires the length of each test item 900*i* in the conveyance direction dc and reflection colors, shape, and mixture level of materials of each test item 900*i*. In other words, the image processing unit 78 is an element that performs processing to acquire information about the size of each test item 900*i*. The morphologic information acquisition unit 70 can include a photointerrupter and/or a laser interferometer (not illustrated) in place of the camera 76*p*. The morphologic information acquisition unit 70 may be referred to as the imaging unit 170. Further, the morphologic information acquisition unit 70 is an element that is selectively employed in the identification apparatus 1000.

Acquisition Unit

As illustrated in FIG. 1A, the acquisition unit 30 acquires identification information Di indicating whether the test item 900*i* is a target test item or a non-target test item, based on the material information Mi or the spectral information Si acquired by the spectral information acquisition unit 100 and the morphologic information Fi acquired by the morphologic information acquisition unit 70. The acquisition unit 30 outputs the acquired identification information Di to the instruction unit 40.

In other words, the acquisition unit 30 identifies properties of the test item 900*i* based on Raman spectra contained in secondary light collected by the light collecting unit 20. In other words, the acquisition unit 30 according to the present exemplary embodiment identifies properties of each test item 900*i* based on a test item image acquired by the camera 76*p* and Raman spectra contained in secondary light collected by the light collecting unit 20.

As a modified example, the spectral information acquisition unit 100 and the morphologic information acquisition unit 70 according to the present exemplary embodiment can be replaced by a hyperspectral camera or a multiband camera capable of acquiring the morphologic information Fi and the spectral information Si from a captured image. Specifically, an identification apparatus (not illustrated) according to the modified example includes a detection system configured to acquire multi-dimensional data from which material information and morphologic information are readable.

Control Unit

The identification apparatus 1000 includes a control unit 400 including the instruction unit 40, a second storage unit 80, and the first storage unit 60. The instruction unit 40 controls discrimination operations of the discrimination apparatus 300 based on the properties of each test item 900*i*. The second storage unit 80 stores a discrimination operation control condition. The first storage unit 60 stores the properties of each test item 900*i*. The control unit 400 includes a display unit 140, and the display unit 140 provides a graphical user interface (GUI) via which a user can designate the control condition. The display unit 140 may display information acquired by the acquisition unit 30.

Storage Unit

The first storage unit 60 is configured to store the identification information Di, the material information Mi, the spectral information Si, the morphologic information Fi, and a timing tp of the passage of the test item 900*i* through the irradiation region in association with one another for each test item 900*i*.

The second storage unit 80 is configured to store the control condition for controlling an intensity Is of discrimination operations of the discrimination apparatus 300 that corresponds to the identification information Di for each test item 900*i*. Forms of the control condition include a referable table, an algebraically-expressed general formula, and statistical information learned by machine learning.

Instruction Unit

The instruction unit 40 estimates, based on the identification information Di from the acquisition unit 30, the passage time of the test item 900*i* through a processing region where the discrimination apparatus 300 discriminates the test item 900*i* based on materials and size of the test item 900*i*, and generates an instruction to control discrimination operations of the discrimination apparatus 300. The passage time of the test item 900*i* through the processing region can be estimated based on at least one of a signal from the morphologic information acquisition unit 70, a signal from the spectral information acquisition unit 100, and a signal from a test item sensor (not illustrated) of the conveyance unit 200.

Discrimination Apparatus

As illustrated in FIG. 1A, the discrimination apparatus 300 includes the air nozzle 330$p$ (p=1 to 8) and a discrimination control unit 340. The air nozzle 330$p$ (p=1 to 8) discharges compressed air for a predetermined discharge time at a discharge velocity and a discharge flow rate. The discrimination control unit 340 controls a solenoid valve (not illustrated) of the air nozzle 330$p$. The discrimination control unit 340 receives a control signal from the instruction unit 40 of the identification apparatus 1000. The discrimination operations of the discrimination apparatus 300 according to the present exemplary embodiment include an operation of discharging fluids. The fluids to be discharged include air, dry nitrogen, inert gas such as noble gas, liquid, and gas-liquid mixture fluids (aerosol). The discrimination apparatus 300 collects the test item 900$i$ in a target collection basket 620 or a non-target collection basket 600 or 640 according to the properties of the test item 900$i$ based on a control signal from the instruction unit 40.

The fluid discharge device of the discrimination apparatus 300 can be replaced with a flap gate that opens and closes at a predetermined angular velocity or a shutter that opens and closes at a predetermined velocity. Furthermore, the morphologic information acquisition unit 70, the spectral information acquisition unit 100, and the discrimination apparatus 300 of the identification apparatus 1000 and the components of the morphologic information acquisition unit 70, the spectral information acquisition unit 100, and the discrimination apparatus 300 can be disposed at different positions in the conveyance width direction dw of the conveyance unit 200 to make the system consolidated and to increase the processing speed. The discrimination apparatus 300 can be considered as a component of the identification apparatus 1000 and may be referred to as "discrimination unit 300".

Conveyance Unit

The conveyance unit 200 is a conveyance unit that conveys the plurality of test items 900$i$ (i=1, 2 . . . ) fed sequentially from the feeder 500 at the predetermined conveyance velocity vc in the conveyance direction dc (the x-direction in FIG. 1). The conveyance unit 200 and the feeder 500 together form the conveyance unit that conveys the test items 900$i$. The feeder 500 is disposed to form a supply portion 550$p$ upstream of the light collecting units 22$a$($p$) and 22$b$($p$) for each conveyance truck TRp (p=1 to 8).

The conveyance unit 200 according to the present exemplary embodiment includes the conveyor belt that conveys the test item 900$i$ fed from the feeder 500 in the conveyance direction dc at the conveyance velocity vc linearly on the conveyance surface 200S. As a modified example, the conveyance unit 200 can be replaced with a turntable feeder that spirally conveys a test item to the outside, a vibration feeder provided with a shaker for moving a test item in a predetermined direction, or a conveyor roller consisting of a plurality of rollers.

The conveyance unit 200 moves the test item 900$i$ so that the test item 900$i$ passes through the imaging field of view 700$p$ of the camera 76$p$. Thus, the conveyance unit 200 may be also referred to as a placement portion 200 for the morphologic information acquisition unit 70. Similarly, the conveyance unit 200 moves the test item 900$i$ so that the test item 900$i$ passes through an effective light collection region 220$p$ of the light collecting unit 20 (20$a$, 20$b$). Thus, the conveyance unit 200 may be also referred to as the placement portion 200 for the light collecting unit 20 (20$a$, 20$b$).

According to the present exemplary embodiment, the conveyance velocity vc of the conveyance unit 200 can be set to 0.1 m/s to 5 m/s in a case of a conveyor belt.

Furthermore, a case where the classification processing of filtering the shape and size of the test item 900$i$ is performed as the feeding preprocessing by the feeder 500 is also an identification method according to a modified example using the identification apparatus 1000 according to the present exemplary embodiment. The preprocessing is performed using a vibration conveyor, a vibration sieve machine, or a crushed particle controller.

Figure 3A:
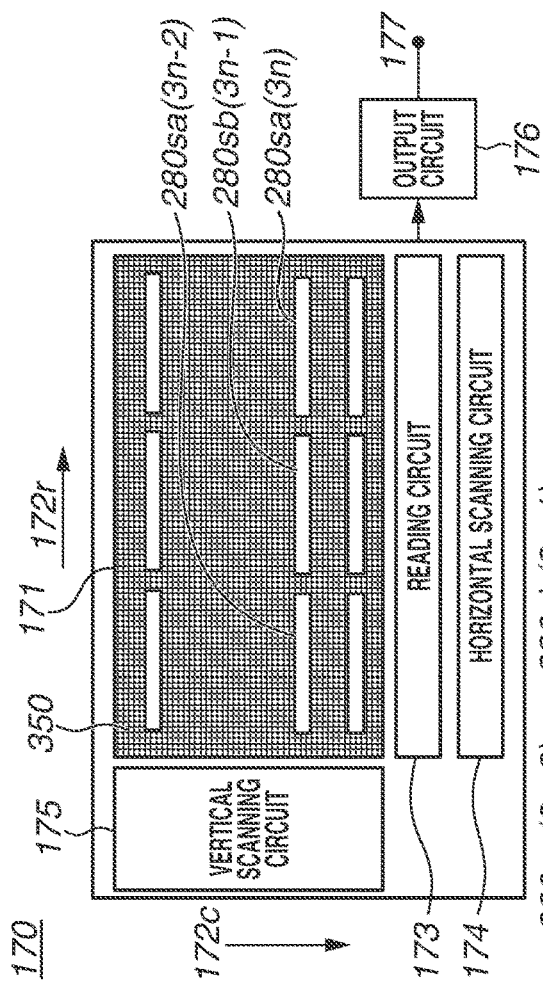
FIGS. 3A and 3B are diagrams illustrating projection regions of optical spectra on an imaging unit and a correspondence relationship between projection wavenumbers and row direction addresses according to a second exemplary embodiment.
Figure 3B:
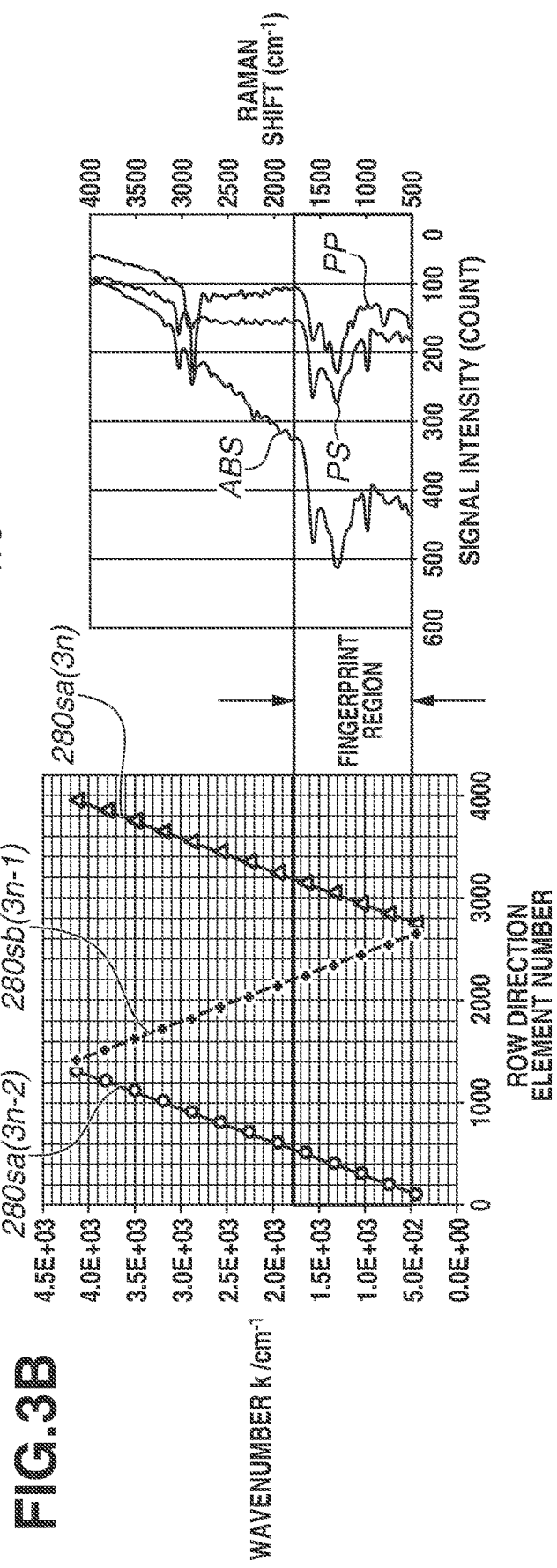

Next, an identification apparatus according to a second exemplary embodiment will be described below with reference to FIGS. 3A and 3B. FIG. 3A is a diagram illustrating a projection of optical spectra to the imaging unit 170 according to the second exemplary embodiment. FIG. 3B is a projection wavenumber—light receiving element address map illustrating a relationship between the element numbers of the light receiving elements 350 arranged in the row direction 172$r$ of the imaging unit 170 and the wavenumbers of optical spectra projected in the row direction 172$r$ according to the present exemplary embodiment.

The identification apparatus according to the second exemplary embodiment projects optical spectral in three columns in parallel in the row direction and can be considered as a modified example of the identification apparatus 1000 according to the first exemplary embodiment. The identification apparatus according to the present exemplary embodiment is different from the identification apparatus 1000 according to the first exemplary embodiment in that the identification apparatus according to the present exemplary embodiment project the optical spectra 280$sa$(3$n$-2), 280$sb$(3$n$-1), and 280$sa$(3$n$) in three columns in parallel in the row direction 172$r$ to the imaging unit 170.

According to the present exemplary embodiment, three spectroscopic elements (not illustrated) are arranged with respect to the imaging unit 170 to reverse the trends of diffraction angles distributed in a fan shape in the row direction 172$r$, whereby the relationship between the projection wavenumbers of adjacent optical spectra and the element addresses as illustrated in FIG. 3B is realized.

The optical spectrum 280$sa$(3$n$-2) is projected to the light receiving elements 350 having the element addresses 101 to 1301 in the row direction 172$r$, and the optical spectrum 280$sb$(3$n$-1) is projected to the light receiving elements 350 having the element addresses 1401 to 2601. As illustrated in FIG. 3B, high wavenumber ends of the optical spectra 280$sa$(3$n$-2) and 280$sb$(3$n$-1) are close to each other, and low wavenumber ends of the optical spectra 280$sa$(3$n$-2) and 280$sb$(3$n$-1) are far from each other. Specifically, the optical spectra 280$sa$(3$n$-2) and 280$sb$(3$n$-1) are projected to the imaging unit 170 so that the high wavenumber ends are closer to each other than the low wavenumber ends.

Similarly, the optical spectrum 280$sa$(3$n$) is projected to the light receiving elements 350 having the element addresses 2701 to 3901 in the row direction 172$r$. As illustrated in FIG. 3B, low wavenumber ends of the optical spectra 280$sb$(3$n$-1) and 280$sa$(3$n$) are close to each other, and high wavenumber ends of the optical spectra 280$sa$(3$n$-2) and 280$sb$(3$n$-1) are far from each other. Specifically, the optical spectra 280$sb$(3$n$-1) and 280$sa$(3$n$) are projected to the imaging unit 170 so that the low wavenumber ends are closer to each other than the high wavenumber ends.

Specifically, the optical spectra 280$sa$(3$n$-2) and 280$sb$(3$n$-1) are close to each other in a CH stretching region where the average signal intensity of Raman scattered light is relatively low. In other words, the optical spectra 280sa (3n-2) and 280sb(3n-1) are parallel in the row direction 172r under a condition where the difference in Raman signal intensity is small and the optical spectra 280sa(3n-2) and 280sb(3n-1) are less likely to affect each other. Similarly, the optical spectra 280sb(3n-1) and 280sa(3n) are close to each other in a fingerprint region where the average signal intensity of Raman scattered light is relatively high. The optical spectra 280sb(3n-1) and 280sa(3n) are parallel in the row direction 172r under a condition where the difference in Raman signal intensity is small and optical spectra 280sb (3n-1) and 280sa(3n) are less likely to affect each other.

Thus, the identification apparatus 1000 of the present exemplary embodiment realizes reduced mutual effects between optical spectra of the imaging unit 170 in the wavenumber direction, as compared to a method in which two adjacent optical spectra are arranged in parallel in a row direction under a condition where the difference in intensity between Raman scattered light detection signals increases.

In the identification apparatus according to the second exemplary embodiment, the crosstalk between the adjacent optical spectra 280sa(3n-2), 280sb(3n-1), and 280sa(3n) is reduced, as compared to a forward direction projection method in which optical spectra are projected in parallel in a forward direction.

Figure 4A:
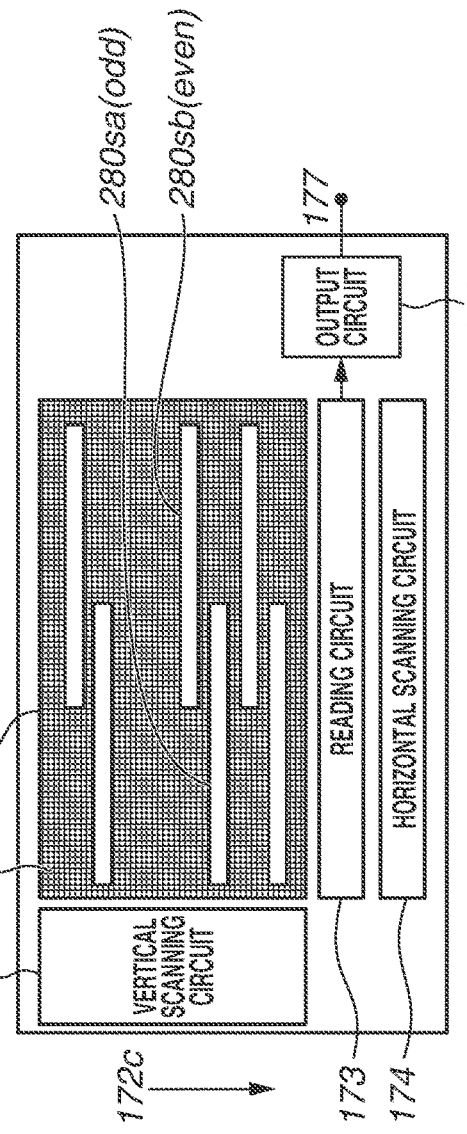
FIGS. 4A and 4B are diagrams illustrating projection regions of optical spectra on an imaging unit and a correspondence relationship between projection wavenumbers and row direction addresses according to a third exemplary embodiment.
Figure 4B:
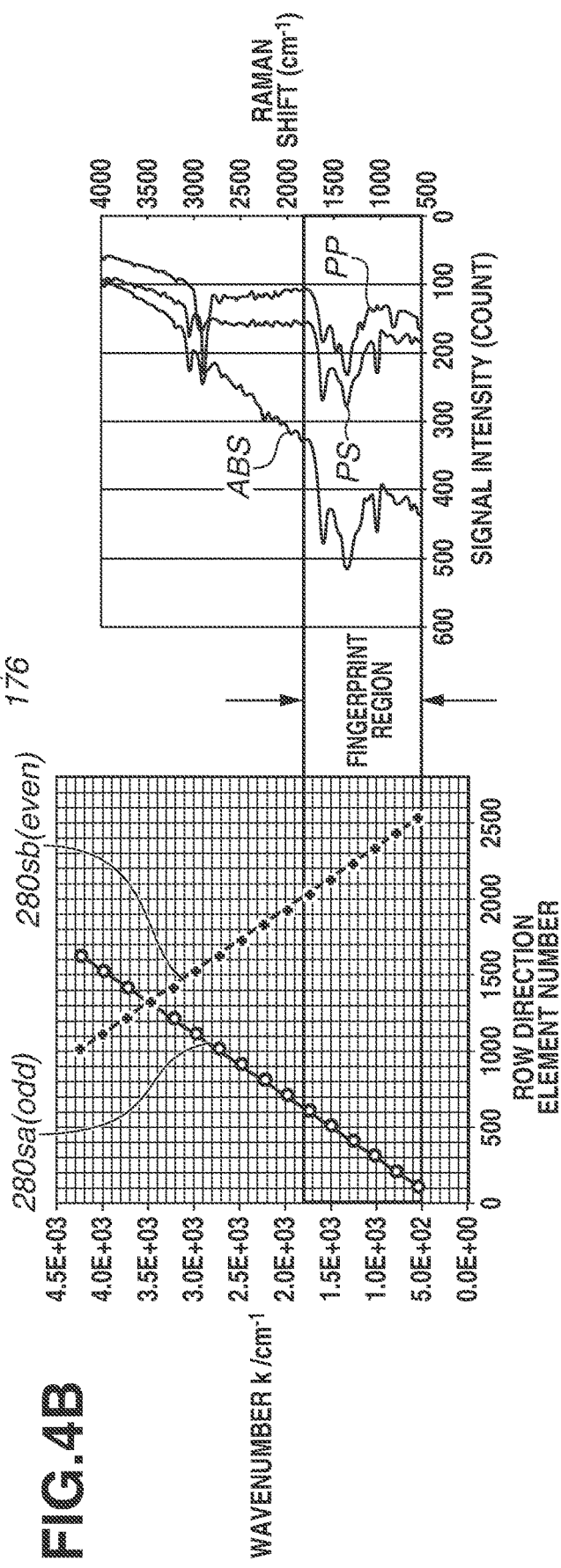

Next, an identification apparatus according to a third exemplary embodiment will be described below with reference to FIGS. 4A and 4B. FIG. 4A is a diagram illustrating a projection of optical spectra to the imaging unit 170 according to the third exemplary embodiment. FIG. 4B is a projection wavenumber—light receiving element address map illustrating a relationship between the element numbers of the light receiving elements 350 arranged in the row direction 172r of the imaging unit 170 and the wavenumbers of optical spectra projected in the row direction 172r according to the present exemplary embodiment.

The present exemplary embodiment is similar to the first exemplary embodiment in that a plurality of optical spectra of light collected by the plurality of collecting units 27a (odd) corresponding to the conveyance trucks TRp of the odd-number columns p is projected in parallel and at a distance from each other in the column direction 172c to the imaging unit 170 by the spectroscopic element 150a. Further, the present exemplary embodiment is similar to the first exemplary embodiment in that light from the test items 900i on the conveyance trucks TRp of the even-number columns p is collected in parallel and the spectroscopic element 150b projects a plurality of optical spectra to different positions in the column direction 172c on the imaging unit 170.

Further, another similarity to the first exemplary embodiment is that adjacent optical spectra 208sa (odd) and 208sb (even) are in opposite directions to each other in the projection wavenumber—element address correspondence relationship and have a band where the optical spectra 208sa (odd) and 208sb (even) are projected to different positions in the row direction 172r.

On the other hand, the present exemplary embodiment is different from the first exemplary embodiment in that the plurality of optical spectra 208sa (odd) and the plurality of optical spectra 208sb (even) are shifted from each other in not only the row direction 172r but also the column direction 172c and are alternately projected to the imaging unit 170. Furthermore, the present exemplary embodiment is different from the first exemplary embodiment in that the plurality of optical spectra 208sa (odd) and the plurality of optical spectra 208sb (even) have a band where the plurality of optical spectra 208sa (odd) and the plurality of optical spectra 208sb (even) are projected to positions where addresses of the light receiving elements 350 in the row direction 172r overlap.

According to the present exemplary embodiment, the optical spectra 208sa (odd) and 208sb (even) are projected to the imaging unit 170 so that high wavenumber ends of the optical spectra 208sa (odd) and 208sb (even) are closer to each other than low wavenumber ends of the optical spectra 208sa (odd) and 208sb (even) in the row direction 172r. Thus, the difference in intensity between the detection signals of the Raman scattered light of the high wavenumbers of the optical spectra 208sa (odd) and 208sb (even) that are close to each other is small, and the crosstalk between the adjacent spectral images is decreased.

With the identification apparatus according to the third exemplary embodiment, the optical spectra 280sa (odd) and 280sb (even) projected adjacently in the row direction 172r are in opposite directions to each other in the projection wavenumber-light receiving element address correspondence relationship. Thus, the identification apparatus according to the third exemplary embodiment realizes reduced crosstalk between optical spectra, as compared to a forward direction projection method in which optical spectra are projected in parallel in a forward direction.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-193344, filed Nov. 20, 2020, which is hereby incorporated by reference herein in its entirety.

What is claimed is:

1. An identification apparatus comprising:
    a plurality of collecting units configured to collect scattered light from a plurality of test items;
    a first spectroscopic unit configured to disperse light from part of the plurality of collecting units;
    a second spectroscopic unit configured to disperse light from a remaining part of the plurality of collecting units;
    an imaging unit configured to acquire a first spectrum projected from the first spectroscopic unit and a second spectrum projected from the second spectroscopic unit, the imaging unit including a plurality of light receiving elements arranged at least in a first direction; and
    an acquisition unit configured to acquire information about the test items based on an output signal from the imaging unit,
    wherein one of a wavenumber of the first spectrum and a wavenumber of the second spectrum in the first direction increases while the other one decreases.

2. The identification apparatus according to claim 1, wherein the first spectrum and the second spectrum are projected to different positions from each other on the imaging unit.

3. The identification apparatus according to claim 1, wherein the first spectrum and the second spectrum are projected to different positions from each other in the first direction.

4. The identification apparatus according to claim 1, wherein the plurality of light receiving elements are arranged in both of a second direction intersecting with the first direction and the first direction, and the first spectrum and the second spectrum are projected to different positions from each other in the second direction.

5. The identification apparatus according to claim 4, wherein in a case where the first direction is a row direction and the second direction is a column direction, the first spectrum and the second spectrum are projected to positions where a row direction address of the light receiving elements overlaps another.

6. The identification apparatus according to claim 1, wherein the first spectrum and the second spectrum are projected so that a low wavenumber end of the first spectrum and a low wavenumber end of the second spectrum are closer to each other than a high wavenumber end of the first spectrum and a high wavenumber end of the second spectrum in the first direction.

7. The identification apparatus according to claim 1, wherein the first spectrum and the second spectrum are projected so that a high wavenumber end of the first spectrum and a high wavenumber end of the second spectrum are closer to each other than a low wavenumber end of the first spectrum and a low wavenumber end of the second spectrum in the first direction.

8. The identification apparatus according to claim 4, wherein the first spectrum and the second spectrum are projected alternately in the first direction and the second direction.

9. The identification apparatus according to claim 1, further comprising:
a plurality of first guiding units configured to guide the light from the part of the plurality of collecting units to the first spectroscopic unit; and
a plurality of second guiding units configured to guide the light from the remaining part of the plurality of collecting units to the second spectroscopic unit.

10. The identification apparatus according to claim 1, further comprising a placement portion on which the plurality of test items are to be placed in a collection region where the plurality of collecting units collects light.

11. The identification apparatus according to claim 10, wherein the placement portion is configured to move the test items in a predetermined direction.

12. The identification apparatus according to claim 11, further comprising a discrimination unit configured to sort the plurality of test items and disposed downstream of the collecting units in the predetermined direction.

13. The identification apparatus according to claim 12, wherein the acquisition unit controls a sorting operation of the discrimination unit based on the spectral information.

14. The identification apparatus according to claim 11, wherein the placement portion includes a conveyance unit having a predetermined direction and a width direction intersecting with the predetermined direction, and the conveyance unit includes a plurality of trucks configured to convey the plurality of test items placed on different positions from each other in the width direction in parallel.

15. The identification apparatus according to claim 1, wherein the first spectroscopic unit and the second spectroscopic unit respectively include a first spectroscopic element and a second spectroscopic element, and a taper angle of the first spectroscopic element and a taper angle of the second spectroscopic element with respect to the imaging unit are different from each other.

16. The identification apparatus according to claim 1, wherein the first spectroscopic unit and the second spectroscopic unit share a spectroscopic element so that the lights from the plurality of collecting units are irradiated different positions from each other.

17. The identification apparatus according to claim 1, further comprising a plurality of irradiation units configured to irradiate the test items with lights in association with the plurality of collecting units.

18. The identification apparatus according to claim 17, wherein the plurality of irradiation units are optically coupled to a plurality of light sources.

19. The identification apparatus according to claim 1, wherein the plurality of collecting units collect Raman scattered lights from the test items.

20. An identification apparatus comprising:
a conveyance unit including a plurality of conveyance trucks and configured to convey a plurality of test items in parallel;
a first collecting unit corresponding to a truck of the plurality of trucks and a second collecting unit corresponding to another truck of the plurality of trucks;
a first spectroscopic unit configured to disperse light from the first collecting unit;
a second spectroscopic unit configured to disperse light from the second collecting unit;
an imaging unit configured to acquire a first spectrum projected from the first spectroscopic unit and a second spectrum projected from the second spectroscopic unit, the imaging unit including a plurality of light receiving elements arranged at least in a first direction; and
an acquisition unit configured to acquire information about the test items based on an output signal from the imaging unit,
wherein an increase direction of a wavenumber of the first spectrum with respect to addresses of the light receiving elements in the first direction and an increase direction of a wavenumber of the second spectrum with respect to the addresses of the light receiving elements in the first direction are opposite to each other.

21. The identification apparatus according to claim 20, further comprising a plurality of irradiation units configured to irradiate the test items in association with the plurality of collecting units.

22. The identification apparatus according to claim 21, wherein the plurality of irradiation units are optically coupled to a plurality of light sources.

23. The identification apparatus according to claim 20, wherein the plurality of collecting units collect Raman scattered lights from the test items.

* * * * *